Dec. 5, 1950     O. LUNDSTROM     2,532,317
ULTRA HIGH FREQUENCY COUPLER
Filed Aug. 25, 1947
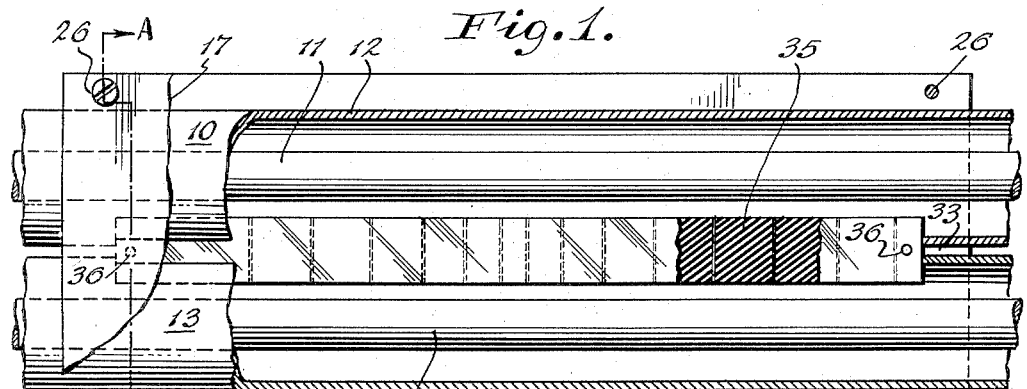
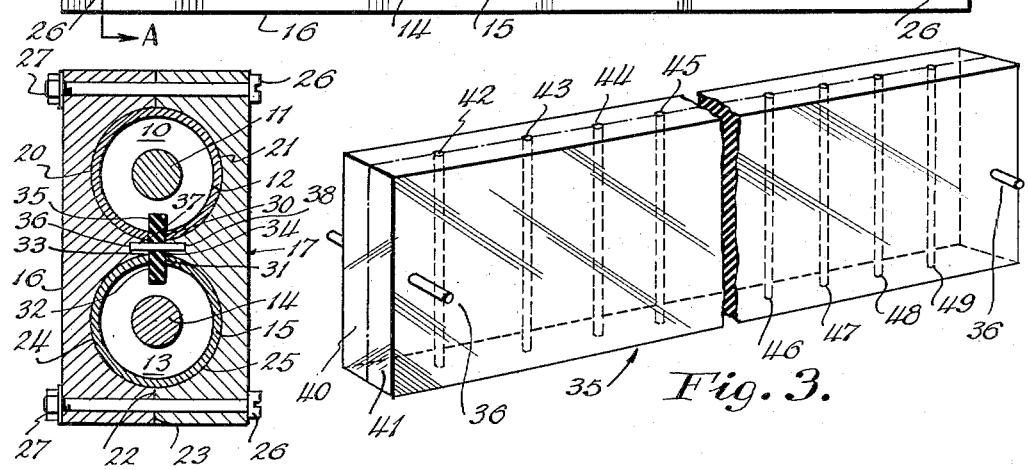
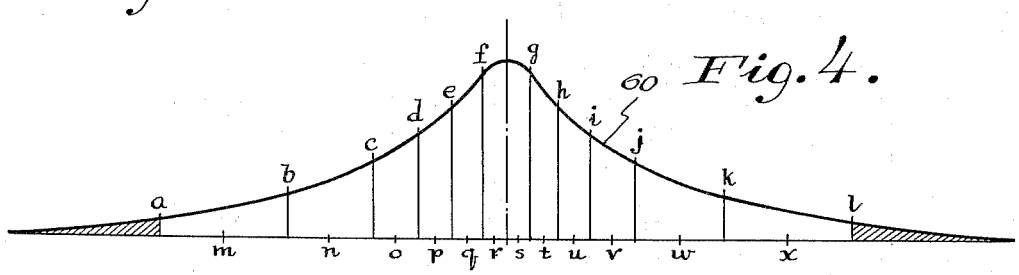
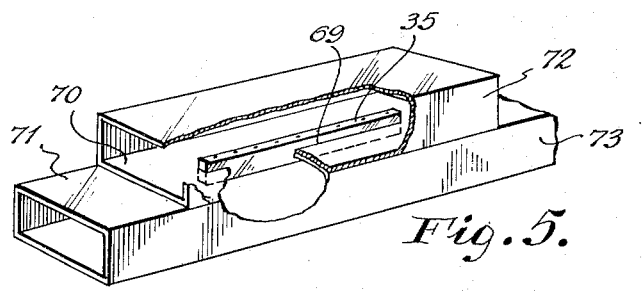
INVENTOR
OSCAR LUNDSTROM
BY
Paul B. Hunter
ATTORNEY Patented Dec. 5, 1950

2,532,317

UNITED STATES PATENT OFFICE 2,532,317

ULTRA HIGH FREQUENCY COUPLER

Oscar Lundstrom, Hempstead, N. Y., assignor to The Sperry Corporation, a corporation of Delaware Application August 25, 1947, Serial No. 770,474

15 Claims. (Cl. 178—44)

The present invention relates to electromagnetic energy couplers between ultra-high-frequency energy transmission lines such as wave guides, dielectric guides, coaxial lines or the like, and in particular relates to directional couplers between any two such ultra-high-frequency transmission lines.

In order to make precise power measurements in a system having a transmission line connecting an energy source to a load, it is desirable that the measurements be independent of any standing waves which may exist in the connecting transmission line. Standing waves are created if a fraction of the incident power is reflected by the load, thereby causing a wave to travel in the reverse direction along the transmission line toward the energy source. If the measurements are to be independent of standing waves and are to give a true indication of the magnitude of the energy traveling from the source to the load (as is usually desired) it is necessary that the measuring means be acted upon only by the energy wave traveling from the source to the load. This result can be achieved by using a coupling means having directional properties, such coupling means in general being designated as a directional coupler.

In general, directional couplers are formed by a short section of main transmission line coupled to a short section of auxiliary line. In operation the main line section is connected in tandem with the main transmission line of the system, and a power responsive element is placed at one end of the auxiliary line section. The coupling between the two line sections should be arranged so that an electromagnetic wave traveling in a single direction along the main line induces an electromagnetic wave traveling in a single direction along the auxiliary line. Likewise the coupling should operate so that a wave traveling in the opposite direction in the main transmission line will induce a wave traveling only in the opposite direction in the auxiliary line.

By arranging the coupling so that a wave traveling in the main transmission line from the source to the load induces a wave in the auxiliary line traveling toward the power responsive element, it is seen that any power indication produced thereby will be the result only of power traveling in the direction toward the load. Any energy that might be reflected by the load will induce a wave in the auxiliary line also, but because of the coupling properties this induced wave will travel away from the power responsive element. Usually a matched termination is provided in the auxiliary line at the end opposite the power responsive element so that the undesired, induced energy will be absorbed. Such an arrangement thus provides a measure of power traveling in a single direction in a transmission system, such measurement being independent of any standing waves which may exist in the transmission line.

In most practical direction couplers, however, an electromagnetic wave traveling in the main transmission line induces two waves traveling in the opposite directions in the auxiliary line. The induced waves are normally greatly unequal in strength. Their relative strength is called the directivity of the coupler and is usually expressed in decibels. The relative strength of the desired induced wave to the wave traveling in the main guide is called the coupling and is also expressed in decibels. The performance of a directional coupler may be described in terms of its directivity and coupling. To operate satisfactorily the directivity of a coupler must exceed some minimum design value at all frequencies within its operating range.

One such known directional coupler consists of a short section of auxiliary rectangular waveguide coupled to a main rectangular waveguide transmission line. A narrow wall of the auxiliary section is fastened rigidly to a narrow wall of the main guide, keeping the longitudinal axes of both guides parallel. Coupling is provided between the main waveguide and the auxiliary section by a pair of longitudinally spaced holes in the common, narrow side wall. A traveling wave in the main guide will induce a traveling wave in the auxiliary guide traveling in the same direction, since the path length of waves induced in the auxiliary guide through the first hole is equal to the path length of the waves induced therein through the second hole, and no electrical interference results. However, the path length of the oppositely directed traveling waves induced through the two holes into the auxiliary guide will be unequal. If the total path length difference is equal to a half-wavelength, cancellation will result and no resulting wave will be induced in the auxiliary guide in a direction opposite to that of the traveling wave in the main guide.

In order to achieve such a half-wavelength path difference, it is necessary that the coupling means (that is, the holes) be spaced one-quarter of a wavelength apart. This, of course, results in the directivity of the coupler being frequency sensitive, and the desired high directivity occurs only at the exact frequency at which the two coupling holes are separated by a quarter wavelength. This frequency is known as the design or center frequency. At frequencies slightly higher and slightly lower than this design frequency the directivity decreases, making the operating range over which the directivity exceeds the minimum design value extremely narrow.

By adding additional coupling elements the frequency operating range may be increased, that is, the range over which the directivity exceeds the minimum design value is broadened. The additional coupling elements which are added to achieve this result are usually equally spaced, and in general the spacing is the same as that of the two-hole coupler: namely, a quarter of a wavelength measured at the design or center frequency. It has been found, however, that in order to provide the desired amount of directivity over a very wide frequency range, the coupling factors of the individual coupling elements must be varied. For example, successful broad band directional couplers have been built similar to the two hole type described, but in which three coupling holes spaced a quarter-wavelength apart are used. The areas of these holes are varied so that their coupling effects are related to each other in accordance with the coefficients of the binomial expansion for three terms: namely, 1, 2, 1. By so adjusting the coupling effect of the individual coupling elements in this manner it is then possible to achieve values of directivity which exceed the minimum allowable design directivity over a wider frequency range than that possible with a simple two-hole coupler.

Coupling loops or coupling probes may be used instead of coupling holes. It is necessary, in such cases, to again make the coupling effects of the individual elements proportional to the coefficients of the binomial expansion. If a large number of coupling elements are to be used, as in the case where a very large operating range is desired, the construction of the coupling elements having varying sizes becomes extremely difficult and costly.

The present invention provides a directional coupler having a wide frequency operating range, but utilizes identical coupling elements. The fact that the coupling elements are of the same size greatly increases the ease in manufacture of the coupler and lowers the cost.

The broad-banding is achieved by varying the spacing between identical coupling members rather than the coupling effect of the individual coupling members themselves. If the spacing between the identical coupling elements is varied in accordance with certain predetermined functions, the integrated coupling effect produces the desired minimum allowable directivity over a wide operating range. Furthermore, the invention provides for a coupling member easy to construct and capable of being built in large numbers. If it is desired to change the value of the coupling of a particular directional coupler, the coupling member may easily be interchanged with another having a different magnitude of coupling. Such interchangeability is many times desirable in laboratory experiments.

Briefly, a direction coupler constructed in accordance with the teachings of this invention comprises a pair of transmission lines, such as coaxial lines, wave guides, etc., oriented parallel to each other and having a common outer wall section or a common coupling channel. Mounted in this common wall section, or coupling channel, parallel to the axes of the coaxial lines, is a section of dielectric material supporting a plurality of identical coupling members. These coupling members are spaced, as stated above, in accordance with a predetermined function in such a manner as to effect a coupling between the two transmission lines which is satisfactorily directive over a considerable range of operating frequencies. The coupling assembly used in this coupler is quite easy to construct and provides an efficient and simple means of directive coupling between the two transmission lines. Furthermore, since the coupling elements are identical, difficulties in their production are greatly reduced.

Accordingly, it is an object of the present invention to provide improved apparatus responsive to the direction of energy flow along an ultra-high-frequency energy conductor.

It is a further object of the present invention to provide improved ultra-high-frequency apparatus for measuring or monitoring the power flow in an ultra-high-frequency conductor traveling in a predetermined direction.

Another object of the present invention is to provide a directional coupler having a high directivity over a broad range of operating frequencies.

It is another object of the present invention to provide coupling means between two ultra-high-frequency energy conductors comprising a plurality of identical coupling members spaced so as to give high directivity over a broad band of operating frequencies.

It is still a further object of the present invention to provide a unitary coupling means between two ultra-high-frequency conductors which is simple to construct and yet provides high directive coupling over a broad operating frequency range.

It is another object of the present invention to provide a directional coupler in which the coupling member may be interchanged with a second coupling member, thereby permitting ready changing of the coupling while maintaining high directivity.

The invention also relates to the novel features or principles of the instrumentalities described herein, whether or not such are used for the stated objects, or in the stated fields or combinations.

Other objects and advantages of the present invention will become apparent in consideration of the following specification and attached drawings, wherein:

Fig. 1 is a cut-away plan view of a directional coupler constructed in accordance with this invention using coaxial type transmission line sections;

Fig. 2 is a section view of the directional coupler shown in Fig. 1 taken along line A—A thereof;

Fig. 3 is a perspective view of the coupling member used in the directional coupler shown in Fig. 1;

Fig. 4 is a graph showing how the spacing between the individual coupling elements of the coupling member shown in Fig. 3 is obtained, and Fig. 5 shows a cut-away perspective view of another directional coupler using wave guide type transmission line section.

Referring now to Fig. 1 there is shown a first section of coaxial line 10 having an inner conductor 11 and an outer conductor 12 oriented parallel to a second section of coaxial line 13 having an inner conductor 14 and an outer conductor 15. Line sections 10 and 13 are rigidly supported in their parallel relationship by a pair of facing, flat, rectangular clamping blocks 16 and 17.

The details of these clamping blocks 16 and 17 are more clearly seen in Fig. 2 which is a section view of Fig. 1 taken along line A—A. A pair of semi-circular grooves 20 and 21 are formed in adjacent faces 22 and 23 of clamping blocks 16 and 17. These grooves 20 and 21 have diameters equal to the outer diameter of outer conductor 12 permitting line section 10 to fit snugly in the bore formed by bringing faces 22 and 23 together. In like manner line section 13 fits snugly in a bore formed by a pair of semi-circular grooves 24 and 25 oriented parallel to grooves 20 and 21. Screws 26 and nuts 27 enable clamping blocks 16 and 17 to be tightly drawn together thereby holding line sections 10 and 13 in rigid parallel relationship.

A pair of longitudinal slots 30 and 31 are provided along adjacent portions of outer conductors 12 and 15 in register with a gap or channel 32 formed between a first face portion 33 existing between grooves 20 and 24 and a second face portion 34 existing between grooves 21 and 25. The resultant channel 32 supports an energy coupling member 35 which is held in place by pins 36 which fit tightly into bores 37 and 38 cut in clamping blocks 16 and 17 at the ends of face portions 33 and 34.

Energy coupling member 35, shown in detail in Fig. 3, consists of two strips of dielectric material 40 and 41 molded or pressed together to form a unitary structure. A plurality of identical coupling elements 42 to 49 are shown imbedded between the dielectric strips 40 and 41. Pins 36, which pass through dielectric strips 40 and 41 at opposite ends thereof serve to maintain coupling member 35 in its proper orientation when assembled in the directional coupler.

In order to make the directivity of the resulting coupler exceed the minimum design value over a broad band of operating frequencies, the spacing between the individual coupling elements 42 to 49 must be varied according to a predetermined function, the function selected determining the resulting minimum directivity and operating range. Also, the elements 42 to 49 should be distributed over a distance long compared with operating wavelengths. The length of the identical coupling elements 42 to 49 determines the magnitude of coupling of the resulting coupling member 35.

As an illustrative example of one such predetermined variable spacing, it has been found that if the distance between adjacent, identical coupling elements is made equal to the spacing between succeeding mean abscissae of those abscissae which define a plurality of adjacent, equal increments of areas lying under a "normal error" curve, the directivity can be made to exceed a value of 30 db over a wide operating range of frequencies. This spacing of coupling elements may be more readily understood by reference to Fig. 4 which is a plot of the normal error curve 60 having the area contained thereunder divided into 12 equal parts by lines $a$ to $l$. The shaded portions under curve 60 beyond lines $a$ to $l$ in each direction are ignored in the division. This is permissible since if the area is divided into a sufficient number of parts these shaded areas represent but a very small fraction of the total area under curve 60 so that the effect of ignoring them is not noticeable. Points $m$ to $x$ represent the mean abscissae values of the abscissae of the dividing lines on either side of the individual point in question. In other words, point $m$ represents the mean abscissa value of lines $a$ and $b$, point $n$ represents the mean abscissa value of lines $b$ and $c$, etc.

In the construction of coupling member 35 following the error function the coupling elements 42 to 49 (which are in effect electric probes) are spaced along the long axis of dielectric strips 40 and 41 by distances proportional of the distance between adjacent points in the group $m$ to $x$. That is, the distance between elements 42 and 43 is proportional to the distance between points $m$ and $n$, the distance between elements 43 and 44 is proportional to the distance between points $n$ and $o$, and so on. Naturally, in the design of the coupling member 35, the area under curve 60 is divided into the same number of equal area increments as the number of coupling elements to be used. The absolute dimensions are not critical as long as the proper proportions are maintained. However, if the distance between coupling elements is large and there are a great number of them, the length of the coupling member 35 becomes so great that it is awkward to handle.

Successful coupling members have been constructed having as many as 96 individual coupling elements. In such case, the area under a normal error curve is divided into 96 equal parts, and the spacing between adjacent coupling elements is then made proportional to the spacing between the mean abscissae of the abscissae of the lines which define adjacent equal area increments. A directional coupler using a pair of ⅞" coaxial line sections coupled together by such a coupling member has a directivity in excess of 30 decibels in the frequency operating range from 1300 to 4000 megacycles. The magnitude of the coupling is determined by the length of the coupling elements.

The spacing between the identical coupling elements, of course, is not limited to such a normal error type distribution as described. Other functions such as a sine-squared or a sine-cubed curve may also be used. Also the coupling elements might be spaced apart by distances that are proportional to the coefficients of the binomial law. The particular function selected depends upon the desired minimum directivity and the width of the operating band. The normal error curve has been shown merely by way of illustration as a desirable and useful form, but it is not intended to so limit the scope of the present invention.

The coupling elements 42 to 49 may take on many forms as may coupling member 35, the one shown being merely illustrative of one type of construction. The elements 42 to 49 may be thin diameter tubes or wires passed through drilled holes in a single dielectric block, or the tubes may be supported along a thin dielectric strip. Another embodiment consists of a plurality of correctly spaced equal diameter holes drilled through a block of conducting material, the holes themselves serving as coupling members.

If it is desired to change the value of coupling of a particular coupler, it is obvious that coupling member 35 may be completely removed and another member whose elements have a different length substituted in its place. This feature of interchangeability of coupling members is very desirable in directional couplers which are to be used in various laboratory experiments each calling for a different coupling.

While the coaxial line sections of the coupler illustrated in Figs. 1 and 2 are shown having their outer conductors 12 and 15 supported by a pair of facing, grooved clamping blocks 16 and 17, it is understood that these line sections could be supported in many other ways, or the bore formed by grooved sections might itself serve as the outer conductors. Furthermore, although the outer conductors in the illustrated embodiment are shown spaced from each other, they could equally well be contiguous and unitary.

Although coupling member 35 is shown in Fig. 1 used in a directional coupler utilizing coaxial transmission line, it may be utilized equally well in a wave guide type coupler. If inner conductors 11 and 14 of Figs. 1 and 2 were omitted, outer conductors 12 and 15 could serve as cylindrical wave guides. Coupling member 35 would operate in the same fashion as before, providing directional coupling between the two cylindrical wave guides.

Fig. 5 shows another type coupler utilizing rectangular waveguide as the transmission line sections. In Fig. 5 coupling member 35 is positioned in a longitudinal slot 69 extending through the adjacent wall sections 70 and 71 of rectangular waveguide sections 72 and 73. Such a directional coupler operates in the same manner as the coaxial type, with the plurality of spaced electric probes serving to provide the directive coupling.

If it is desired to link the magnetic field rather than the electric field between two transmission lines, electric probes 42 to 49 may be replaced by a plurality of identical coupling loops. Again, if the spacing between the adjacent coupling elements is made proportional to some predetermined function such as the distance between adjacent points in the group of points $m$ to $x$ of Fig. 4, the resulting directivity will be quite large over a broad band of operating frequencies. As before, the coupling elements (the coupling loops) are all identical and thus are quite easy to manufacture. Identical holes in a conducting strip might also be used in place of loops or probes. As before, the holes should be of equal diameter and spaced according to a predetermined function in the same manner as the probes.

Thus, by proper spacing of a plurality of identical energy coupling elements in a unitary coupling member, it is possible to provide directive coupling between a pair of transmission lines, either coaxial or waveguide, which is sufficiently large so as to permit operation of the coupler over a broad band of frequencies. The coupling member utilizes identical coupling elements thereby making the manufacture of such a coupling member and the directional coupler in which it is used extremely simple. The minimum directivity or operating range of the directional coupler may be easily changed by interchanging coupling members whose identical coupling elements have spacing which follow different predetermined functions. The magnitude of coupling may be easily changed by interchanging coupling members whose individual identical coupling elements are of a different length.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An ultra-high-frequency energy directional coupler comprising a first section of coaxial transmission line, a second section of coaxial transmission line oriented parallel to said first section and having a common outer conductor section therewith, said common conductor section having an axially directed slot, a dielectric strip member mounted in said slot, and a plurality of spaced coupling elements supported by said dielectric strip member.

2. Apparatus as in claim 1 wherein said coupling elements are parallel electric probes.

3. Apparatus as in claim 2 wherein said parallel electric probes are equal length.

4. Apparatus as in claim 3 wherein said parallel electric probes lie in a plane defined by the axis of said first and second sections of coaxial line.

5. Apparatus as in claim 4 wherein the axes of said parallel electric probes are perpendicular to the axes of said first and second sections of coaxial transmission line.

6. An ultra-high-frequency energy directional coupler comprising a first section of transmission line, a second section of transmission line oriented parallel to said first section and having an outer wall section adjacent thereto, said outer wall section having an axially directed slot, a dielectric strip member mounted in said slot, and a plurality of identical energy coupling means disposed in said strip member along an axis parallel to the axes of said first and second transmission lines, said energy coupling means being spaced from each other by distances proportional to the spacing between succeeding mean abscissae of those abscissae which define a like plurality of adjacent equal increments of area lying under a normal error curve.

7. An ultra-high-frequency energy directional coupler comprising a first section of rectangular wave guide, a second section of rectangular wave guide oriented parallel to said first section and having a common broad wall section therewith, said common wall section having an axially directed slot therein, a dielectric strip member mounted in said slot, and a plurality of spaced, identical coupling elements supported by said dielectric strip member.

8. Apparatus as in claim 7 wherein said coupling elements are parallel electric probes.

9. Apparatus as in claim 8 wherein said parallel electric probes are of equal length.

10. Apparatus as in claim 9 wherein said parallel electric probes lie in a plane defined by the longitudinal axes of said first and said second section of wave guide.

11. Apparatus as in claim 10 wherein the axes of said parallel electric probes are perpendicular to the axes of said first and second section of wave guide.

12. An ultra-high-frequency directional coupler comprising a first section of rectangular wave guide, a second section of rectangular wave guide oriented parallel to said first section and having a broad wall section adjacent thereto, and a plurality of identical energy coupling means disposed in said adjacent wall sections along an axis parallel to the axes of said first and second sections of wave guide, said energy coupling means being spaced from each other by distances proportional to the spacing between succeeding mean abscissae which define a like plurality of adjacent equal increments of area lying under the normal error curve.

13. An ultra-high-frequency energy directional coupling comprising a first section of rectangular wave guide, a second section of rectangular wave guide oriented parallel to said first section and having a common broad wall section therewith, said common wall section having an axially directed slot, and a coupling member mounted in said slot consisting of a dielectric strip supporting a plurality greater than three of identical energy coupling means spaced along said coupling member, the spacing between any pair of coupling means being different from the spacing between the next adjacent pair of energy coupling means.

14. An ultra-high-frquency energy directional coupler comprising a first section of coaxial transmission line having a longitudinally directed slot in its outer conductor, a second section of coaxial transmission line having a longitudinally directed slot in its outer conductor, said first and second line sections being oriented so the said slots are parallel to each other and contiguous thereby forming a channel between said first and second section of coaxial line, a dielectric strip member mounted in said channel, and a plurality of spaced coupling elements supported by said dielectric strip member.

15. An ultra-high-frequency energy directional coupler comprising a first section of transmission line, a second section of transmission line oriented parallel to said first section and having a common wall section therewith, said common wall section having an axially directed slot, a dielectric strip member mounted in said slot and a plurality of spaced coupling elements supported by said dielectric member.

OSCAR LUNDSTROM.

REFERENCES CITED

The following references are of record in the file of this patent:

UNITED STATES PATENTS

| Number | Name | Date |
| --- | --- | --- |
| 2,423,390 | Korman | July 1, 1947 |

FOREIGN PATENTS

| Number | Country | Date |
| --- | --- | --- |
| 545,936 | Great Britain | June 18, 1942 |